March 23, 1965
G. JOHNSON
3,174,314
GATE LOCKING APPARATUS
Filed Feb. 15, 1963
4 Sheets-Sheet 1
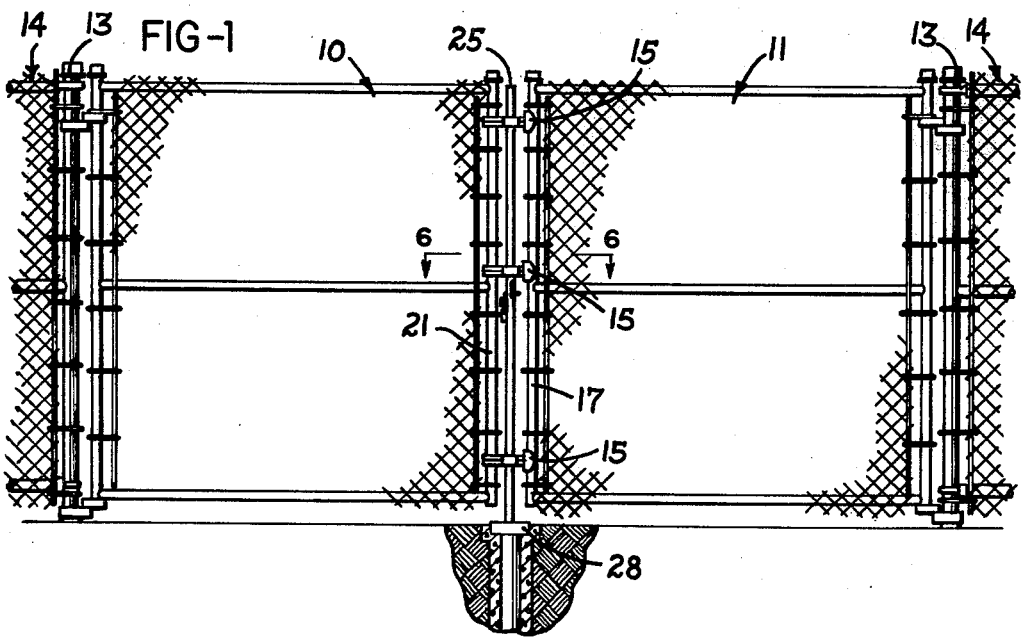
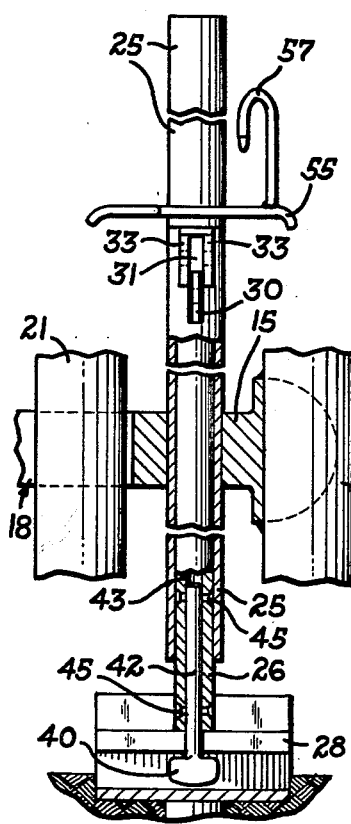
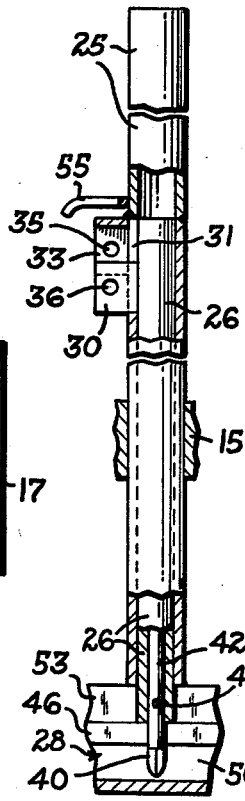
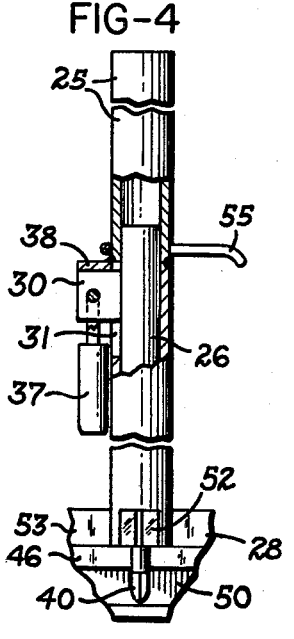
INVENTOR.
GRADY JOHNSON
BY
Mareschal, Biebel, French & Bugg
ATTORNEYS

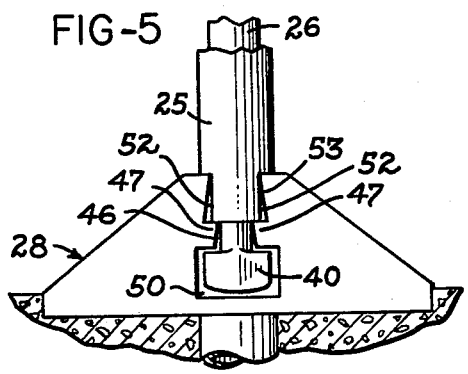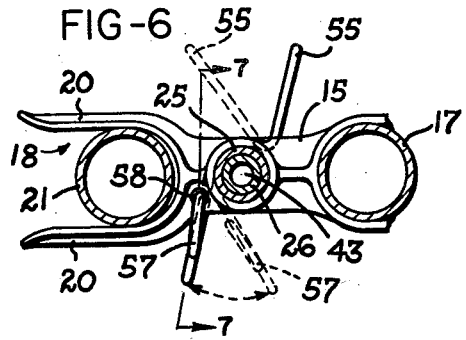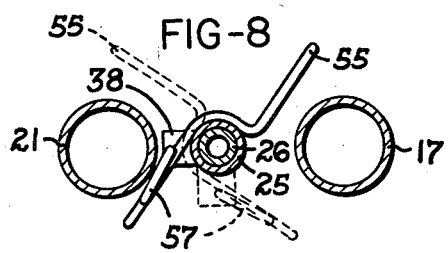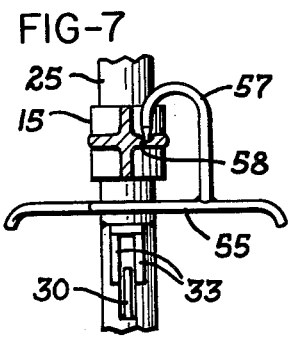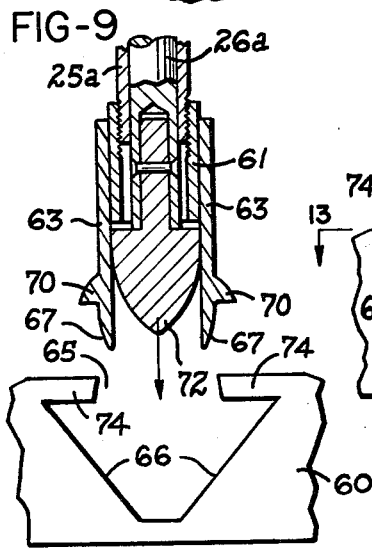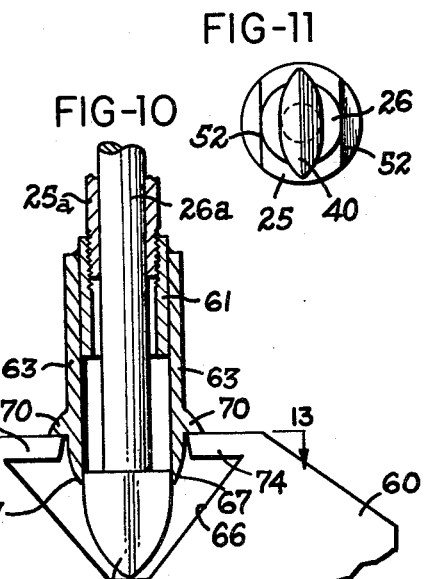

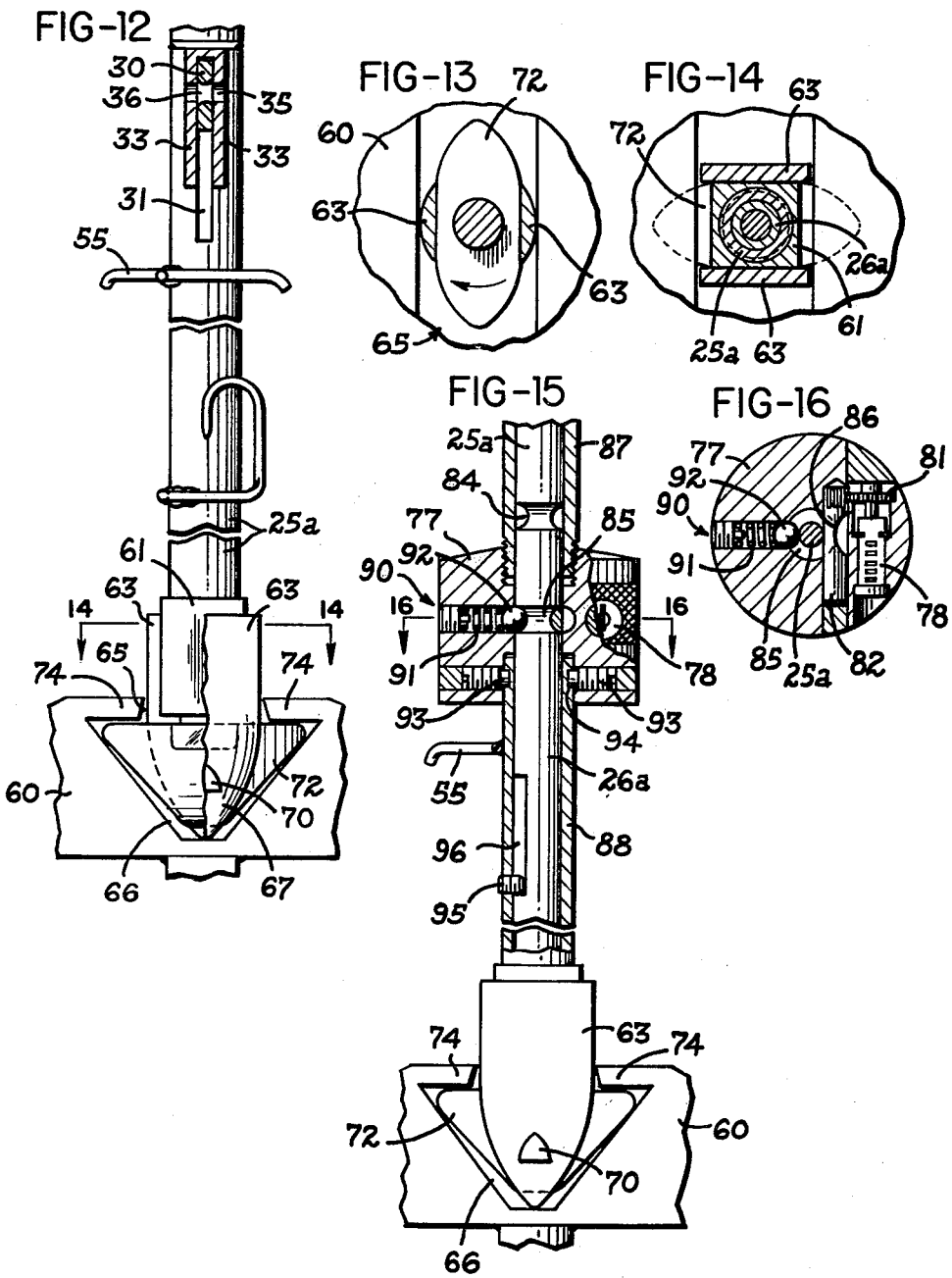

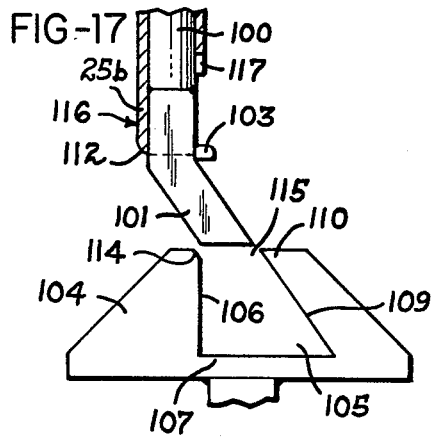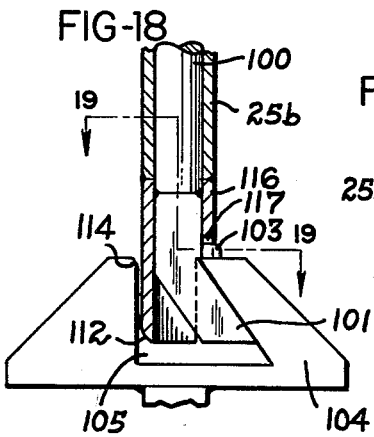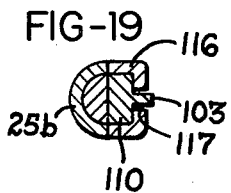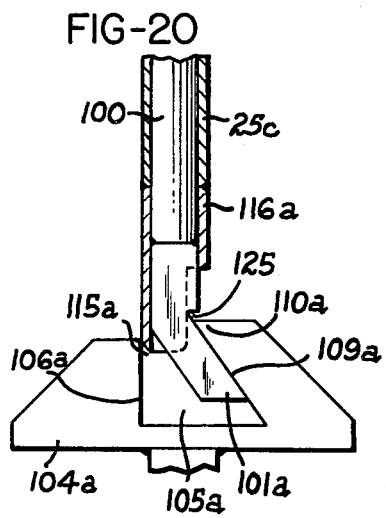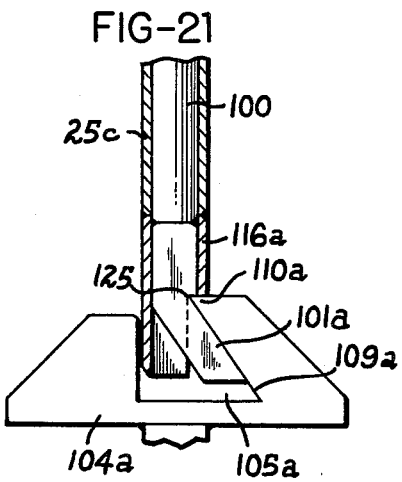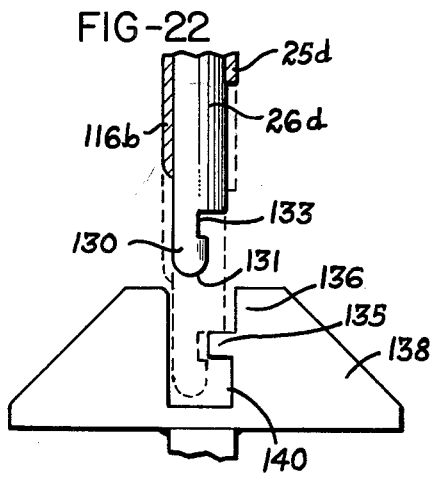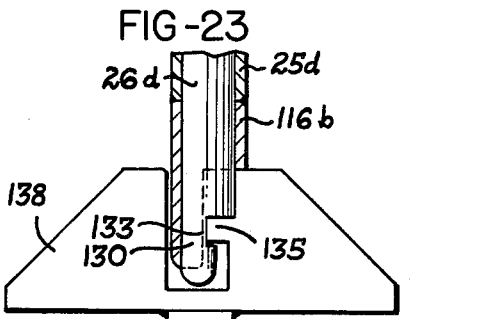

United States Patent Office 3,174,314
Patented Mar. 23, 1965

3,174,314
GATE LOCKING APPARATUS
Grady Johnson, % Cross Country Fence Service,
5550 Linde Ave., Dayton 32, Ohio
Filed Feb. 15, 1963, Ser. No. 258,740
13 Claims. (Cl. 70—77)

This invention relates to apparatus for gate locks and particularly to apparatus which will interlock one or two swingable gates in the closed position.

Many problems are presently encountered with the locking devices for large industrial gates utilized to block roadway entrances to industrial sites. The present practice is to provide locking apparatus in the form of a vertically slidable member or drop rod supported by several fork members secured along the vertical frame member of a gate and engageable with a vertical post or the vertical frame member of another gate when both are closed. The drop rod is lowered into a shoe mounted in the ground to lock gates together by preventing angular or lateral movement of the fork members so that the gates are held together. Once in the shoe the drop rod is padlocked against vertical movement so the gates are effectively locked in their closed position.

This construction suffers from the disadvantage that when the ground swells or contracts thereby raising, lowering or tilting the shoe, or when the gate sags, the drop rod is no longer properly aligned with the shoe. In some instances, the rod will be short of engagement with the shoe thereby preventing the gates from being locked. In addition, many of the present lock devices are positioned on one side of the closed gate thus requiring additional effort to unlock the gates from the opposite sides. Further, it is often possible to raise manually the loosely mounted gates thereby removing the drop rod from the shoe and thus permitting the gates to be easily unlocked.

Accordingly, an important object of the invention is to provide improved locking apparatus for use in locking one or more swingable gates together wherein the vertical spacing between the drop rod and shoe is not critical and may vary without adversely affecting the capability of these components to mate in locking engagement.

Another object of this invention of a gate locking assembly which can be operated with ease from either side of the closed gate, and includes a drop rod which locks into the ground to prohibit removal therefrom until the locking device is disengaged.

A further object of the invention is to provide a locking assembly that can readily be adapted to conventional double gate assembly wherein a drop rod is utilized to lock the gates in the closed position, and particularly to gates of this type wherein the swelling of the ground or sagging of the gates will not misalign the drop rod and the shoe which is secured to the ground for receiving this drop rod.

Another object of this invention is to provide an improved gate locking system wherein the various components are free from the adverse effects of freezing water, as well as being relatively easy to operate, simple in design so that they have a maximum of reliability, and inexpensive to manufacture thus reducing the ultimate cost to the user.

Other objects and advantages of the invention will be apparent from the following description, the accompanying drawings and the appended claims.

In the drawings—

FIG. 1 is an elevation view illustrating a dual gate arrangement embodying the present invention;

FIG. 2 is a broken elevational view, partially in section, of the gate locking apparatus;

FIG. 3 is a view looking from left to right of the apparatus as shown in FIG. 2;

FIG. 4 is a view similar to FIG. 3, showing the apparatus in the locked position;

FIG. 5 is a fragmentary elevation view on an enlarged scale showing the foot and shoe elements in their interlocked position;

FIG. 6 is an enlarged sectional view taken along line 6—6 of FIG. 1;

FIG. 7 is a sectional view along line 7—7 of FIG. 6;

FIG. 8 is a sectional view similar to FIG. 7 with the fork removed to illustrate the alternative positions of the locking mechanism;

FIG. 9 is an enlarged fragmentary sectional view of another embodiment of the foot and shoe elements;

FIG. 10 is a view similar to FIG. 9 showing the foot in its lowered position;

FIG. 11 is a bottom end view of the tubular member and the foot;

FIG. 12 is an elevation view of another embodiment of the invention;

FIG. 13 is a sectional view along the line 13—13 of FIG. 10;

FIG. 14 is a view similar to FIG. 13 taken along line 14—14 of FIG. 12;

FIG. 15 is a fragmentary sectional view of another embodiment of the locking mechanism;

FIG. 16 is a sectional view essentially along the line 16—16 of FIG. 15;

FIG. 17 is a side view partially in section of another foot-shoe embodiment;

FIG. 18 is a view similar to FIG. 17 but showing the foot engaging the shoe;

FIG. 19 is a sectional view taken essentially along the line 19—19 of FIG. 18;

FIGS. 20 and 21 are views similar to FIGS. 17 and 18, respectively, illustrating a further embodiment of the invention; and FIGS. 22 and 23 are also views similar to FIGS. 17 and 18, respectively, illustrating a further embodiment of a shoe and cooperating foot.

Referring to the drawings, FIG. 1 shows a typical application of the invention to the two swingable gates 10 and 11 which are pivotally secured to the anchor posts 13 of the fence 14 such that they pivot between an open and closed position in the usual manner. As shown, the fence 14 and the gates 10 and 11 are covered with a suitable wire mesh, or its equivalent, which is secured to the various frame members thereof. The apparatus for locking these gates in their closed position includes a number of coupling members or forks 15 rigidly secured, for example, on the vertical frame element 17 of the right-hand gate 11, as by riveting or welding.

As shown in FIG. 6, these forks 15 have a U-shaped opening 18 between the fingers 20 on one side thereof which will engage the vertical frame element 21 of the left-hand gate 10, as viewed in FIG. 1, so that when the gates 10 and 11 are closed these members assume the relative positions shown in FIG. 6. The forks 15 slidably support the tubular member 25 (see FIGS. 2–5) which has the drop rod 26 positioned therein for limited movement in a vertical direction, and these members cooperate with the shoe 28 securely positioned in the ground for locking the forks 15, and hence the gates 10 and 11, against lateral movement.

The lock projection 30 is rigidly secured to the rod 26 and extends through the slot 31 in the tubular member 25 so that movement of the rod 26 is limited by the vertical extremities of this slot. Both the ears 33, which are provided on either side of the slot 31, adjacent the uppermost end thereof, have an aperture 35 therein which will align with a similar aperture 36 in the projection 30 so that the lock 37 (FIG. 4) can be inserted therethrough to secure these members together. A cover plate 38 extends between the ears 33 adjacent the top of the slot 31 to protect the lock 37 and the slot 31 from freezing rain and the like which might obstruct movement of the projection 30.

A lock element or foot 40 has a support rod 42 integral therewith preferably made of hardened metal which resists the cutting action of most metal cutting devices. The rod 42 fits in the bore 43 formed in the drop rod 26 and is secured therein by a number of conventional rivets 45 or the like. The foot 40 is rectangular and has a thickness which is slightly less than the width of the slot 46 (FIG. 5) formed between the shoulders 47 in the shoe 28. When the foot is lowered through the elongated slot 46 and rotated 90° it will assume the position shown in FIG. 5, wherein it is locked in lower groove 50 against upward movement.

The bottom end of the tubular member 25 has the relieved portions 52 on opposite sides of the lower end thereof (see FIGS. 4 and 5) so that this member will fit into the upper groove 53 formed in the shoe 28 and lock the member 25 against relative angular movement. When the foot 40 is aligned with the slot 46 such that it can be lowered into the groove 50, the relieved sides 52 will be displaced angularly 90° from alignment with the upper groove 53 since the member 25 and the drop rod 26 are locked against relative angular movement. When the member 25 is rotated into alignment with the upper groove 53, it can be lowered, with respect to the shoe 28, to the position shown in FIG. 5 wherein it is held against angular movement. During this movement the member 25 moves vertically relative to the rod 26 with the projection 30 sliding from the lower end of the slot 31 to the upper end thereof, where the apertures 35 and 36 are aligned so that the lock 37 can be utilized to secure these members together.

Just below the center fork 15 is a handle member 55 (see FIGS. 2 and 6) is welded or otherwise secured to the tubular member 25 with its ends extending to opposite sides of the gates 10 and 11, thus permitting operation of the gate lock mechanism from either side. A hook 57 is secured to this handle on one side thereof and moves therewith, for engagement with the indentation 58 in the center fork 15 to support the tubular member 25 in its raised position when the gates are opened (FIG. 7).

In operation, the gates 10 and 11 are locked together by moving them to a closed position, wherein the vertical frame members 17 and 21 assure the aligned positions shown in FIG. 6, and the fingers 20 of the forks 15 extend on both sides of the left-hand frame member 21. The handle 55 is utilized to rotate the tubular member 25, and hence the drop rod 26, so that the foot 40 will pass through the slot 46 into the lower groove 50. Next the member 25 is rotated through 90° thus causing the foot 40 to assume the position shown in FIG. 5, wherein the shoulders 47 prohibit it from being removed vertically from the shoe 28. Simultaneously with this rotation, the tubular member 25 is rotated to a position wherein it drops into the upper groove 53. In this position, the foot 40 prohibits upward movement of the drop rod 26, and the tubular member 25 prohibits relative rotation of this drop rod.

When the tubular member 25 has dropped into the upper groove 53 the apertures 35 and 36 in the projection 30 and the ears 33, respectively, are aligned and the lock 37 can be passed therethrough to secure these two members against relative axial movement. Consequently, the tubular member 25 cannot be raised and the foot 40 cannot be rotated, and the member 25 and the rod 26 are locked to the shoe 28. Since the tubular member is locked in position, the forks 15 cannot pivot or move in a lateral direction and the gates 10 and 11 are locked in the closed position.

The shoe 28 can be shifted in a vertical direction by swelling of the ground without in any way affecting the operation of this lock mechanism, since the tubular member 25 and the associated drop rod 26 are free to move vertically with respect to the forks 15 to accommodate any change in the vertical position of the shoe 28. Also, a limited canting of the shoe 28 or misalignment of the gates will not materially affect the operation of the locking components since the side walls of the upper groove 53 are undercut such that this groove will receive the tubular member 25 when the shoe 28 and/or the member 25 are tilted about the vertical.

To unlock the gate mechanism it is merely necessary to remove the lock 37, raise the tubular member 25 to remove the relieved portions 52 from the upper groove 53, and rotate this tubular member so that the foot 40 is turned 90° in the lower groove 50. The handle 55 is then raised to lift the drop rod 26 and the foot 40 from engagement with the shoe 28 and the hook 57 is placed into engagement with the indentation 58 in the center fork 15. Thus the member 25 and rod 26 are placed in a stored or unlocked position wherein they do not interfere with the lateral movement of the forks 15, and consequently do not obstruct the opening of the gates 10 and 11.

Another embodiment of the invention which is especially adapted for breaking ice which may form in the shoe 60, is shown in FIGS. 9 through 15, wherein the tubular member 25a has threadedly secured on the lower end thereof a sleeve member 61 having a square outer configuration (FIG. 14) which carries, secured on two opposite sides, the elongated lock plates 63. The elongated plates 63 have a width slightly less than the width of the entrance slot 65 to the V-shaped groove 66 in the shoe 60, and these members also have bullet-shaped noses 67 thereon for self-alignment with the slot 65, as well as for aiding in the breaking of ice which might accumulate in the groove 66, as will be described.

The lugs 70 are formed near the lowermost ends of these plates for engagement with the shoe 60 on either side of the entrance slot 65, so that when the V-shaped foot 72 is lowered into position through the slot 65 the plates 63 will not jam between the shoulders 74 of the shoe 60 and the foot 72. When the tubular member 25a is rotated from the position shown in FIG. 10, the lugs 70 disengage the shoulders 74 so that the plates 63 and the tubular member 25a drop into the groove 66 in the manner shown in FIGS. 14–15, the V-shaped foot 72 is locked against angular movement by the plates 63, and the foot 66 prohibits upward movement of the drop rod 26a.

Since the groove 66 is V-shaped, any water or other fluid which flows thereinto will tend to concentrate in the apex of this groove, and the points of the V-shaped foot 66 and the side plates 63 can be used as ice breakers by reciprocating the tubular member 25a by use of the handle 55. That is, the foot 72 can be reciprocated when in the position shown in FIG. 10 to break the ice in the groove 66 and the side plates 63 can be similarly reciprocated when the tubular member is rotated through 90° to the position shown in FIG. 15.

When the drop rod 26a and tubular member 25a are in the locked position, as shown in FIGS. 12 and 15, they may be secured in this position in the manner described above in connection with the embodiment shown in FIGS. 2–5 by use of the projection 30 and ears 33, or they can be locked by the mechanism shown in FIGS. 15 and 16. The latter locking mechanism includes a body member 77 having the conventional lock assembly 78 therein for rotating the gear 81 which in turn rotates the toothed lock pin 82. The drop rod 25a is provided with two circumferential grooves 84 and 85 (FIG. 15) which are engaged by the lock pin 82 to hold this rod in either of two positions. By inserting a key in the locking member 78, the pin 82 can be rotated through 180° from the position shown in FIG. 16 to a position wherein the relieved portion 86 permits the drop rod 25 to move without obstruction in a vertical direction. A detent 90 consisting of a spring 91 which biases the ball 92 is also provided in the housing 77 for insuring the precise positioning of the drop rod 26a with respect to the tubular member 25a such that the lock pin 82 will be aligned with the groove 84 or 85.

The body member 77 can be freely rotated about the vertical through 360° and thus it may be unlocked from either side of the gates 10 and 11. For this purpose the body member 77 is threaded to the upper section 87 of the tubular member 25a, and rotatably secured on the lower section 88 of this member 25a by the pins 93 which are threaded in the body member 77 and are received in the slot 94 in the section 88. Thus when the body member 77 is rotated through 360° it causes only angular movement of the upper tube section 87 which is an effective part of the tubular member 25a. The lower section 88 of the tubular member 25a is held against rotation in the locked position by the engagement of the side plates 63 with the entrance slot 65, and drop rod 26a is held against relative angular movement with respect to the tubular section 88 by the pin 95 which is threaded through the lower section 88, and engages the elongated slot 96 in the drop rod 26a. Thus in the locked position the lock pin 82 engages the groove 85, the tubular member 25a cannot be raised to withdraw the plates 63 from the shoe 60 and consequently the foot 72 cannot be rotated, so that these members are locked to the shoe 60.

The embodiments shown in FIGS. 17 through 23 illustrate other modifications of the foot-shoe locking apparatus wherein the tubular members do not require rotation in order to lock the foot in the shoe. Thus in the FIGS. 17–19 embodiment, the drop rod 100 has a projection or foot 101 which forms an acute angle with the vertical or longitudinal axis of the rod and having a support lug 103 provided at the top of the foot. The shoe 104 is mounted in the ground in a manner similar to the shoe described above, and the slot 105 formed in the shoe has one side 106 perpendicular to the base 107 while the other side 109 is undercut with the top edge 110 overhanging the remainder of this side.

Thus, in operation, lug 103 engages the edge 110 so that the foot 101 will be held in contact with the similarly shaped side wall 109 so that it is held against downward movement.

The member 25b is then lowered so that the smoothly curved surfaces 112 thereon contact the similarly shaped edge 114 on one side of the entrance slot 115 thus forcing the drop rod 100 to the right, as viewed in FIG. 18, so that the foot 101 is forced against the wall 109 and the tubular member 25b can drop into the groove 105. The lower portion 116 of the tubular member 25b has a cut-out portion 117 which clears the lug 103 and the right side of the foot 101 (FIG. 18), and the portion 116 has a square outer configuration (FIG. 19) so that it will not rotate when it has been lowered into the groove 105. Hence the rod 100 prohibits upward movement of the tubular member 25b, and the lower portion 116 prohibits rotary movement in the tubular member 25b so that the foot 101 cannot be withdrawn until the member 25b is first withdrawn.

The FIGS. 20 and 21 embodiment is substantially identical with the FIG. 17 embodiment except that the support lug 103 has been eliminated and the undercut 125 formed in the foot 101a so that the edge 110a of the slot 105a will be engaged thereby for supporting the foot against further downward movement thereby holding it against the wall 107a of the shoe 110a. The left-hand shoulder 126 has a slightly reduced height to facilitate entrance of the lower portion 116a of the tubular member 25c, and otherwise the operation of this embodiment is substantially the same as that described above in connection with FIGS. 17–19.

Similarly, the FIGS. 22–23 embodiment is substantially identical to the FIGS. 17–19 embodiment except that the foot 101 and the overhanging slanted shoulder 109a has been replaced by a foot 130 having a rounded head 131 for facilitating the alignment of the groove 133 formed therein with the projection 135 formed on the right-hand shoulder 136 of the shoe 138. Thus when the drop rod 26d is lowered into the groove 140 the foot 130 assumes the position shown in broken lines in FIG. 22, and subsequently when the tubular member 25d is lowered into position the groove 133 engages the projection 135 in the manner shown in FIG. 23 so that the drop rod 26d cannot be moved in a vertical direction. The lower portions 116a and 116b of the tubular members 25c and 25d in the FIGS. 20–21 and 22–23 embodiments also have a square outer cross-section, as indicated in FIG. 19, so that these tubular members will be held against rotation when lowered into the grooves in the shoes 104a and 138.

The various embodiments of the foot-shoe combination described above can be used with either of the disclosed locking mechanisms (FIG. 3 or 15) or with other suitable locking devices. In addition, it is contemplated that other structurally different but functionally equivalent foot-shoe combinations may be adapted to use with the herein described inventive combinations of a drop rod, tubular member, and foot-shoe locking arrangement.

While the forms of apparatus herein described constitute preferred embodiments of the invention, it is to be understood that the invention is not limited to these precise forms of apparatus, and that changes may be made therein without departing from the scope of the invention which is defined in the appended claims.

What is claimed is:

1. Locking apparatus comprising a vertically movable elongated member, lock shoe means having groove means of predetermined configuration formed therein, a drop rod disposed in said elongated member and having a foot on one end thereof for engagement with said shoe means, said elongated member being movable between a locked position wherein said member is held in said groove against relative rotation and a spaced position wherein said member is disengaged from said shoe means, said foot and said groove means cooperating so that said foot is held in said groove means against outward movement when said elongated member is in said locked position, and means for locking said member against relative movement when said elongated member is in said locked position.

2. Locking apparatus comprising a vertically movable tubular member having a square outer configuration on one end thereof, lock shoe means having a groove of predetermined configuration formed therein, a rod disposed in said tubular member and having a foot on one end thereof for engagement with said shoe means, at least one shoulder on said shoe means overhanging said groove to define an entrance slot thereto, said foot having a thickness less than the width of said slot and a configuration complementary to said groove, said tubular member being movable between a locked position wherein said one end engages said slot and is held against relative rotation and a spaced position wherein said one end is disengaged from said groove, said foot and said shoe means cooperating so that said foot is held in said groove against outward movement when said tubular member is in said locked position, and means for locking said member and said rod against relative movement when said tubular member is in said locked position.

3. Locking apparatus comprising a vertically movable tubular member having a square outer configuration on one end thereof, lock shoe means having a groove of predetermined configuration formed therein, at least one shoulder on said shoe means overhanging said groove to define an entrance slot thereto, a rod disposed in said tubular member and having a foot on one end thereof with a configuration complementary to said groove for locking engagement therewith, said tubular member being movable between a spaced position wherein said one end is disengaged from said groove and a locked position wherein said one end engages said slot and is held against relative rotation, said foot and said shoulder cooperating so that said foot is held in said groove against outward movement by said shoulder when said tubular member is in said locked position, and means for locking said member and said rod against relative movement when said tubular member is in said locked position.

4. Locking apparatus for use with a swingable gate having a generally vertical element adjacent the traveling end thereof, comprising fork means on the vertical element for engagement with a second vertical element to hold the gate in a closed position, a tubular member carried by said fork means for vertical slidable movement, a lock shoe secured in the surface of the ground in vertical alignment with said tubular member when the gate is in said closed position and having a lock groove therein, a drop rod mounted in said tubular member for vertical movement, said drop rod having a foot thereon for locking engagement with said groove, said tubular member being movable between a locked position wherein said tubular member engages said groove and is held against rotary movement and an open position wherein said member disengages said shoe, said foot having a configuration that will only pass into said groove when said member is in said support position, and cooperating lock means on said foot and said shoe for locking said drop rod against upward or rotary movement when said tubular member is in said locked position.

5. Locking apparatus for use with a swingable gate having a generally vertical element adjacent the traveling end thereof, comprising fork means on the vertical element for engagement with a second vertical element for locking the gate in a closed position, a tubular member carried by said fork means for vertical slidable movement, a lock shoe secured in the surface of the ground in vertical alignment with said tubular member when the gate is in said closed position, said shoe having a groove therein and a shoulder which extends parallel to and partially covers said groove and defines an entrance slot to said groove, a drop rod mounted in said tubular member and held therein against relative rotary movement, said drop rod having a foot thereon complementary to said groove, said tubular member being rotatable between an unlocked position wherein the lower end thereof is supported above said groove and a locked position wherein said lower end of said tubular member engages said slot and is held against rotary movement by said shoulder, said foot having a configuration that will only pass through said slot into said groove when said member is in said unlocked position, said foot cooperating with said groove and said shoulders to lock said member against upward movement when said tubular member is in said locked position.

6. Locking apparatus for use with a swingable gate having a generally vertical element adjacent the traveling end thereof, comprising fork means on the vertical element for engagement with a second vertical element to lock the gate in a closed position, a tubular member mounted in said fork means for vertical slidable movement, a lock shoe secured in the surface of the ground in vertical alignment with said tubular member when the gate is in said closed position, said shoe having a groove therein and shoulder means which extends parallel to and partially covers said groove and defines an entrance slot to said groove, a drop rod positioned in said tubular member for vertical movement, means on said drop rod and said tubular member cooperating to prohibit relative angular movement, said drop rod having a foot thereon which will pass through said slot and rotate to a locked position wherein upward movement of said rod is prohibited by said shoulder means, means on said tubular member movable therewith to a lowered position for engaging said shoulder means to prohibit rotary movement of said tubular member when the same is in said lowered position so that said rod cannot be rotated to disengage said groove, and means for locking said tubular member in said lowered position.

7. In combination with two vertically swingable gates having vertical frame elements on the swingable ends thereof which are spaced apart when the gates are in a closed position, one of the frame elements having a plurality of fork members rigidly secured thereto for engagement with the other of the frame elements when the gates are moved to the closed position, locking apparatus for securing the fork members against lateral movement when in the engaged position, comprising a drop rod mounted in the fork members for vertical slidable movement, lock shoe means secured in the surface of the ground in vertical alignment with said drop rod when the gate is in the closed position, said shoe means having a groove therein with shoulder means which extends parallel to and partially covers said groove and defines an entrance slot to said groove, said drop rod having foot means thereon which will pass through said slot and rotate to a locked position wherein upward movement of said rod is prohibited by said shoulder means, and means for locking said drop rod against rotation when in said locked position.

8. Locking apparatus for use with a swingable gate having a generally vertical element adjacent the traveling end thereof, comprising fork means on the vertical element for engagement with a second vertical element to hold the gate in a closed position, a tubular member mounted in said fork means for vertical slidable movement, a lock shoe secured in the surface of the ground in vertical alignment with said tubular member when the gate is in said closed position, said shoe having a groove therein and at least one shoulder which partially covers said groove and defines an entrance slot thereto, said tubular member having a flat surface on two opposite sides of the lower end thereof with the distance between said surfaces being slightly less than the width of said entrance slot, said tubular member being movable to a locked position wherein said member engages said groove with the surfaces parallel to said shoulders so that said tubular member is held against rotary movement, a drop rod mounted in said tubular member for vertical movement, a foot on the lower end of said drop rod cooperating with said tubular member and said groove so that it will engage said shoulders to hold said drop rod against upward movement when said tubular member is in said locked position, and means for locking said tubular member and said drop rod against relative movement when said tubular member is in said locked position.

9. Locking apparatus comprising a vertically movable tubular member having a square outer configuration on one end thereof, lock shoe means having a groove of predetermined configuration formed therein, shoulder means on said shoe means overhanging said groove means to define an entrance thereto, a rod held in said tubular member against relative rotation and having a foot on one end thereof for locking engagement with said shoulder means, said tubular member being movable between a locked position wherein said one end is held in said entrance against relative rotation and a spaced position wherein said member is disengaged from said groove, said foot and said shoe means cooperating so that said foot is held in said groove means against outward movement when said tubular member is in said locked position, body means rotatably mounted on said tubular member and having an aperture therethrough through which said rod extends, a circumferential groove in said rod, and a semi-cylindrical key-actuated plug rotatably mounted in said body means movable between a disengaged position wherein said rod is free to move axially with respect to said member and an engaged position wherein said plug engages said circumferential groove and prohibits relative axial movement of said rod and said member, said circumferential groove being aligned with said plug when said member is in said locked position.

10. Locking apparatus for use with a swingable gate having a generally vertical element adjacent the traveling end thereof, comprising fork means on the vertical element for engagement with a second vertical element to hold the gate in a closed position, a tubular member mounted in said fork means for vertical slidable movement, a lock shoe secured in the surface of the ground in vertical alignment with said tubular member when the gate is in said closed position, said shoe having a V-shaped groove therein and at least one shoulder which partially covers said groove and defines an entrance slot thereto, said tubular member having a flat surface on two opposite sides of the lower end thereof with the distance between said surfaces being slightly less than the width of said entrance slot, said tubular member being movable to a locked position wherein said member engages said groove with the surfaces parallel to said shoulders so that said tubular member is held against rotary movement, a drop rod mounted in said tubular member for relative vertical movement, a foot on the lower end of said drop rod cooperating with said V-shaped slot and said shoulder so that it will engage said shoulders to hold said drop rod against upward movement when said tubular member is in said locked position, and means for locking said tubular member and said drop rod against relative movement when said tubular member is in said locked position.

11. Locking apparatus for use with a swingable gate having a generally vertical element adjacent the traveling end thereof, comprising fork means on the vertical element for engagement with a second vertical element to hold the gate in a closed position, a tubular member mounted in said fork means for vertical slidable movement, a lock shoe secured in the surface of the ground in vertical alignment with said tubular member when the gate is in said closed position, said shoe having a groove therein and at least one shoulder which partially covers said groove and defines an entrance slot thereto, said tubular member having a flat surface on two opposite sides of the lower end thereof with the distance between said surfaces being slightly less than the width of said entrance slot, said tubular member being movable between a locked position wherein said member engages said groove with the surfaces parallel to said shoulders so that said tubular member is held against rotary movement and an unlocked position, means prohibiting said member from engaging said shoulders when in said unlocked position, a drop rod mounted in said tubular member for vertical movement, a foot on the lower end of said drop rod cooperating with said tubular member and said groove so that it will engage said shoulders to hold said drop rod against upward movement when said tubular member is in said locked position, and means for locking said tubular member and said drop rod against relative movement when said tubular member is in said locked position.

12. Locking apparatus for use with a swingable gate having a generally vertical element adjacent the traveling end thereof, comprising fork means on the vertical element for engagement with a second vertical element to hold the gate in a closed position, a tubular member mounted in said fork means for vertical slidable movement, a lock shoe secured in the surface of the ground in vertical alignment with said tubular member when the gate is in said closed position, said shoe having a groove therein and a square shoulder which extends perpendicularly to the axis of said tubular member and defines an entrance slot to said groove, said tubular member having a flat surface on opposite sides of the lower end thereof with the distance between said surfaces being slightly less than the width of said entrance slot, said tubular member being movable to a locked position wherein said member engages said groove with said surfaces parallel to said shoulders so that said tubular member is held against rotary movement, a drop rod mounted in said tubular member for vertical movement, a foot on the lower end of said drop rod having a square notch therein for engaging said shoulder to hold said drop rod against upward movement when said tubular member is in said locked position, said tubular member forcing engagement between said notch and said shoulder when it is moved into said locked position.

13. Locking apparatus for use with a swingable gate having a generally vertical element adjacent the traveling end thereof, comprising fork means on the vertical element for engagement with a second vertical element to hold the gate in a closed position, a tubular member mounted in said fork means for vertical slidable movement, a lock shoe secured in the surface of the ground in vertical alignment with said tubular member when the gate is in said closed position, said shoe having a groove therein with one side thereof extending upwardly at an angle to the axis of said tubular member to form a shoulder overhanging said groove and defining an entrance slot to said groove, said tubular member having a flat surface on opposite sides of the lower end thereof with the distance between said surfaces being slightly less than the width of said entrance slot, said tubular member being movable to a locked position wherein said member engages said groove with said surfaces parallel to said shoulders so that said tubular member is held against rotary movement, a drop rod mounted in said tubular member for vertical movement, a foot on the lower end of said drop rod having a lock portion which extends at said angle to one side of the axis of said rod for engaging said shoulder to hold said drop rod against upward movement when said tubular member is in said locked position, said tubular member forcing engagement of said lock portion and said shoulder when it is moved into said locked position.

References Cited in the file of this patent

UNITED STATES PATENTS

| | | |
|---|---|---|
| 1,262,185 | Drew | Apr. 9, 1918 |
| 1,654,913 | Beemer | Jan. 3, 1928 |
| 2,953,916 | Thomas | Sept. 27, 1960 |